United States Patent [19]

Kobayashi et al.

[11] Patent Number: 5,208,696
[45] Date of Patent: May 4, 1993

[54] SPATIAL LIGHT MODULATING DEVICE WITH CRT INPUT IMAGE

[75] Inventors: Yuji Kobayashi; Tsutomu Hara; Yoshiharu Ooi, all of Shizuoka, Japan

[73] Assignee: Hamamatsu Photonics Kabushiki Kaisha, Shizuoka, Japan

[21] Appl. No.: 362,551

[22] Filed: Jun. 7, 1989

[30] Foreign Application Priority Data

Jun. 23, 1988 [JP] Japan ................. 63-155430

[51] Int. Cl.$^5$ ............... G02F 1/03; G02F 1/07; G02B 26/00
[52] U.S. Cl. ............... 359/245; 359/238; 359/242
[58] Field of Search .......... 350/345, 356; 359/245, 359/238, 242

[56] References Cited

U.S. PATENT DOCUMENTS

| | | | |
|---|---|---|---|
| 4,481,531 | 11/1984 | Warde et al. | 350/342 |
| 4,678,286 | 7/1987 | Hara | 350/356 |
| 4,818,983 | 4/1989 | Hara et al. | 350/345 |
| 4,854,677 | 8/1989 | O'Meara | 350/355 |

FOREIGN PATENT DOCUMENTS

| | | |
|---|---|---|
| 64742 | 4/1983 | Japan . |
| 42119 | 2/1987 | Japan . |
| 43045 | 2/1987 | Japan . |

OTHER PUBLICATIONS

Hara et al., "A Spatial Light Modulator" Advances in Electronics and Electron Physics, vol. 64B.
Shinoda et al., "Electron Beam Addressed Spatial Light Modulator", SPIE vol. 613 Nonlinear Optics and Applications, 1986.

Primary Examiner—Rolf Hille
Assistant Examiner—Robert Limanek
Attorney, Agent, or Firm—Finnegan, Henderson, Farabow, Garrett and Dunner

[57] ABSTRACT

An input incoherent optical image to be supplied to a microchannel spatial light modulator (MSLM) is produced by a CRT in accordance with an input electric signal provided from a computer. An output coherent optical image is read-out by launching a laser beam into an electro-optic material incorporated in the MSLM which stores the input image as a refractive index distribution.

7 Claims, 2 Drawing Sheets

SPATIAL LIGHT MODULATING DEVICE WITH CRT INPUT IMAGE

BACKGROUND OF THE INVENTION

The present invention relates to a spatial light modulating device which performs optical information processing using a microchannel spatial light modulator.

A microchannel spatial light modulator (MSLM) has been known as an electron tube that performs incoherent to coherent conversion of light. A spatial light modulating device that uses a microchannel spatial light modulator is described in, for example, Japanese Patent Application Unexamined Publication Nos. 64742/1983 and 43045/1987.

The principle of optical information processing with a spatial light modulating device is shown in FIG. 4. A microchannel spatial light modulator generally indicated as 3 comprises a photoelectric conversion means including a photocathode 4, a microchannel plate (MCP) 5 for electron multiplication that is disposed at the electron-emitting side of the photocathode 4, a mesh electrode 6 used to collect secondary electrons emitted from the surface of an electro-optic crystal plate 7, and the electro-optic crystal plate 7 typically made of LiNbO$_3$ (lithium niobate). These components are sealed in a vacuum envelope.

When an incoherent input optical image is incident on the photocathode 4, it emits photoelectrons to create an electron image. This electron image is amplified with MCP 5 and passes through the mesh electrode 6 to fall on the electro-optic crystal plate 7 where an electric charge image is formed. Since the electric field traversing the crystal plate 7 is dependent on the quantity of electric charge, the refractive index distribution of the crystal will change by Pockels effect. When the electro-optic crystal plate 7 is illuminated with a laser beam (linearly polarized laser beam) through a half mirror 8, a phase change is induced in the light reflected from the surface of the electro-optic crystal plate 7 (the surface on the side closer to the photocathode 4) according to the quantity of electric charge. Thus, by allowing the reflected beam to pass through a polarizing plate 31, a coherent output optical image is obtained as modulated with the incoherent input optical image.

The microchannel spatial light modulator that employs the photocathode 4 as an electron source is generally referred to as an "optically addressable type" and features several capabilities for processing input information, such as threshold operations, logic operations and contour extraction.

The optically addressable type of microchannel spatial light modulator, however, has the problem of difficulty in entering a video input because of the need to create an input optical image on the photocathode 4. Another disadvantage is the complexity of systems such as a lens system. It has therefore been proposed that the photocathode be replaced by an electron gun to perform electric addressing. Even in this approach, an electron lens system and an electromagnetic coil are needed to focus and deflect electron beams. As a further problem, some interface with a computer is required if one wants to write in two-dimensional information obtained by calculations on the computer.

The forementioned Publication No. 64742/1983 proposes a technique that has been developed to solve these problems of the prior art by using a matrix array of light-emitting elements. However, on account of the non-uniformity in the luminous efficiency of the light-emitting elements, the resultant output image will not have a uniform distribution of intensity. In order to provide uniformity in the intensity of output image, the writing time needs to be extended but then high-speed processing becomes impossible. Another problem is the difficulty in improving resolution owing to the size of the light-emitting elements. Improved resolution cannot be attained without unduly increasing the size of the matrix of light-emitting elements as well as the size of the lens system.

SUMMARY OF THE INVENTION

An object, therefore, of the present invention is to provide a spatial light modulating device that is simple in construction and which is capable of rapid and precise optical information processing.

This object of the present invention can be attained by a spatial light modulating device that comprises a spatial light modulator having, in a vacuum enclosure, photoelectric conversion means and electro-optic means which stores an electron image from said photoelectric conversion means to create in itself an optical change, laser means that launches a laser beam into said electro-optic means to produce a modulated laser beam, optical image display means that is disposed in a face-to-face relationship with the light-receiving surface of said photoelectric conversion means and that converts an input electric signal into an optical image and displays the latter, and control means for supplying said input electric signal to said optical image display means.

The device of the present invention may further include a half mirror between the display surface of said optical image display means and the light-receiving surface of said photoelectric conversion means, as well as sending means for sending the modulated beam light to the half mirror. In this preferred embodiment, the optical image from the optical image display means is transmitted through the half mirror to be incident on the light-receiving surface of the photoelectric conversion means, and the modulated laser beam from the sending means is reflected from the half mirror so as to be incident on the light-receiving surface of the photoelectric conversion means.

According to another preferred embodiment of the present invention, there is provided a spatial light modulating device which includes the following components in addition to the spatial light modulator and the laser means described above: first optical image display means that is disposed in a face-to-face relationship with the light-receiving surface of the photoelectric conversion means and which converts a first input electric signal into a first optical image and displays the latter; first control means which supplies said first input electric signal to said first optical image display means; a half mirror that is interposed between the display surface of said first optical image display means and the light-receiving surface of the photoelectric conversion means and which transmits the first optical image from the first optical image display means so that it is incident on the light-receiving surface of the photoelectric conversion means; second optical image display means that is disposed on the other side of the half mirror and which converts a second input electric signal into a second optical image and displays the latter; and second control means which supplies said second input electric signal to said second optical image display means.

In the spatial light modulating device of the present invention, an incoherent input optical image is created with the optical image display means such as CRT, and the incoherent optical image produced by this display means is easy to control with a suitable apparatus such as a computer. Thus, input image information can be entered with the same level of simplicity as is attained in the electric addressing method and yet a threshold operation or other operations can be performed on three-value (ternary) images as in the case where the optical addressing method is adopted. Synchronous detection and various other functions can also be realized by employing a plurality of optical image display means. The embodiments of this invention can also easily convert an image transmitted from a video camera into an incoherent image and then subject the incoherent image to the above operations.

Other and further objects, features and advantages of the invention will appear more fully from the following description taken in connection with the accompanying drawings.

DETAILED DESCRIPTION OF THE INVENTION

Three embodiments of the present invention are described hereinafter with reference to FIGS. 1-3, in which the same components are identified by like numerals to eliminate the need for redundant explanation.

Figure 1:
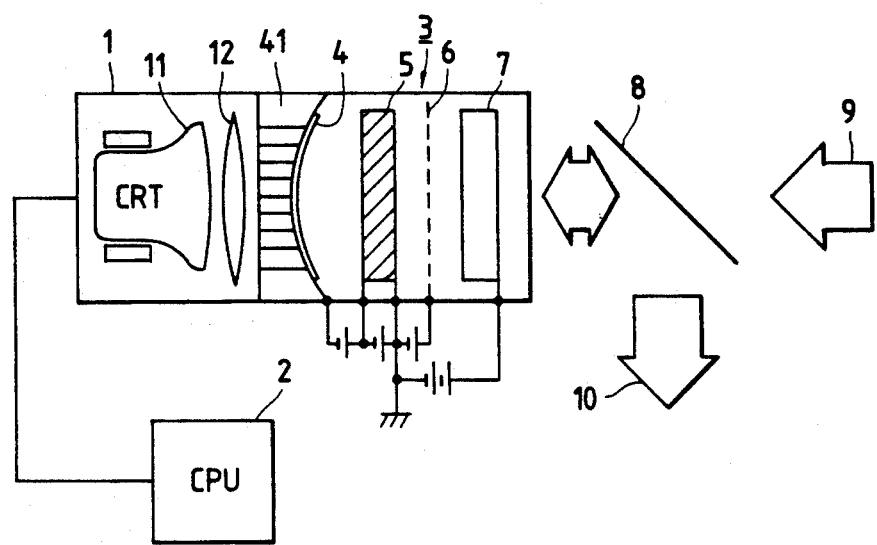
FIG. 1 shows schematically the construction of a spatial light modulating device according to a first embodiment of the present invention.

FIG. 1 shows schematically the construction of a spatial light modulating device according to a first embodiment of the present invention. As shown, an optical fiber plate 41 is disposed on the front side of a photocathode 4, and a writing unit 1 composed of a CRT 11 and an image-forming lens 12 is disposed in front of the fiber plate 41. The display on the CRT 11 is controlled by a computer or CPU 2. If desired, "optical fiber coupling" may be effected by using an optical fiber bundle in place of the image-forming lens 12.

In the first embodiment of the present invention, an incoherent input optical image is created on the screen of the CRT 11 under the control of the CPU 2. The incoherent image is focused on the photocathode 4 via the image-forming lens 12 and optical fiber plate 41. As a result, electric charges in a pattern corresponding to the incoherent optical image are accumulated on an electrooptic crystal plate 7. Thus, by launching an incident laser beam 9 into the crystal plate 7 via a half mirror 8, a modulated laser beam 10 can be obtained. Combining the advantages of the electric and optical addressing methods, the device according to the first embodiment of the present invention is adapted for convenient and yet high-grade optical information processing.

Figure 2:
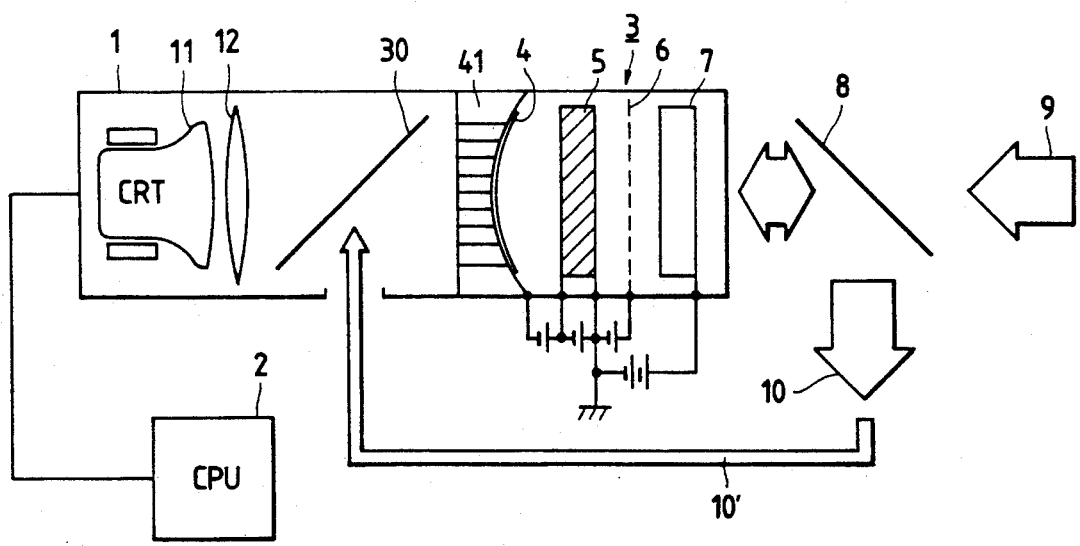
FIG. 2 shows schematically the construction of a spatial light modulating device according to a second embodiment of the present invention.

FIG. 2 shows schematically the construction of a spatial light modulating device according to a second embodiment of the present invention. This second embodiment differs from the first embodiment in that a half mirror 30 is disposed between the image-forming lens 12 in the writing unit 1 and the optical fiber plate 41 in the microchannel spatial light modulator 3. The half mirror 30 transmits the incoherent optical image from the CRT 11 so that it is projected onto the photocathode 4; the half mirror 30 also reflects the modulated laser beam 10 to be projected onto the photocathode 4. The feedback loop thus formed insures effective phase compensation so that the device of this second embodiment may be used in optical communication. The modulated laser light 10 is sent to the half mirror 30 by such means as a total reflection mirror.

Figure 3:
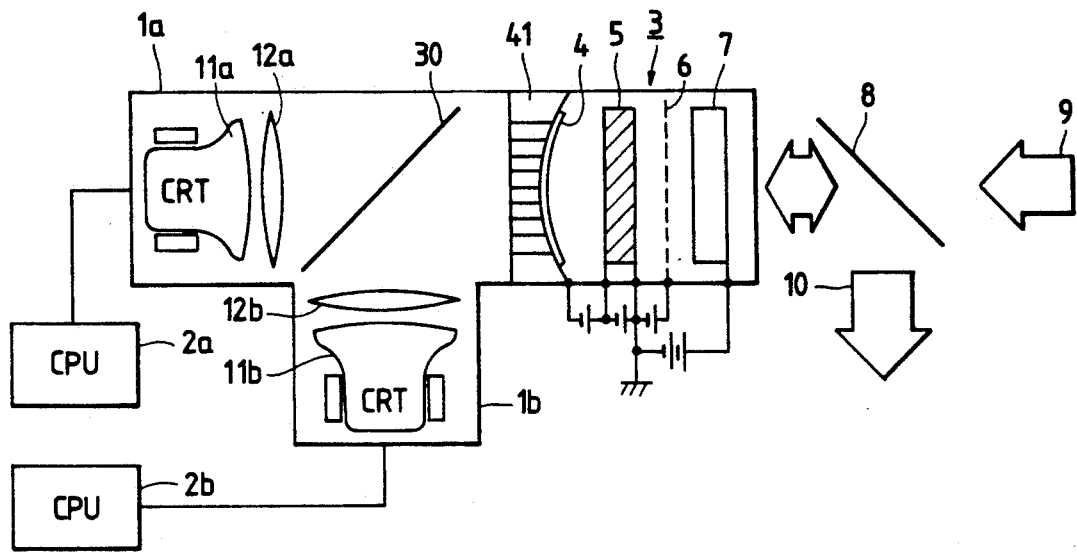
FIG. 3 shows schematically the construction of a spatial light modulating device according to a third embodiment of the present invention.
Figure 4:
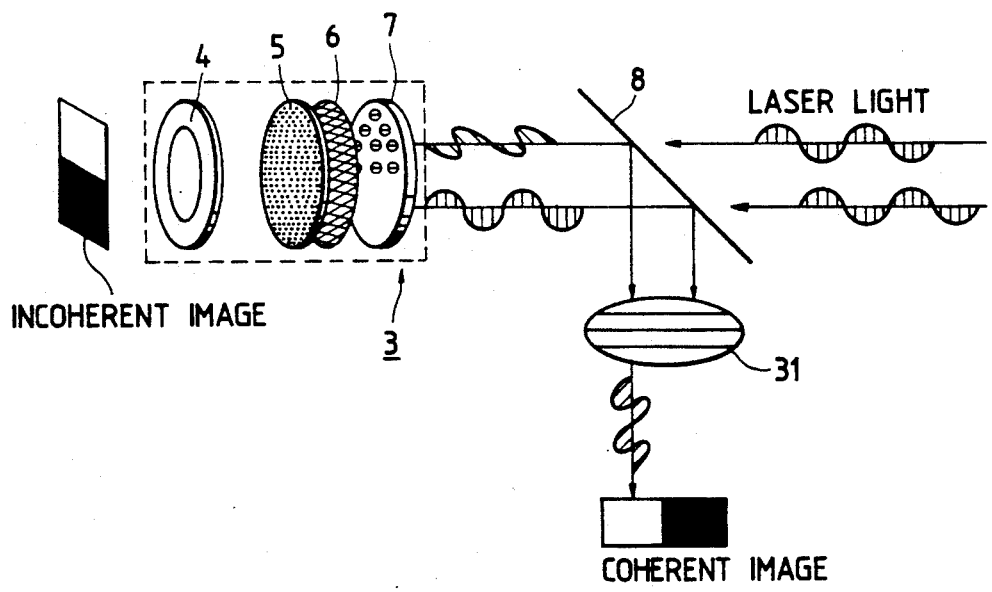
FIG. 4 illustrates the principle of optical information processing with a microchannel spatial light modulator.

FIG. 3 shows schematically the construction of a spatial light modulating device according to a third embodiment of the present invention. This third embodiment differs from the first embodiment in that two sets of CRT (11a, 11b) and image-forming lens (12a, 12b) are provided in the writing unit 1, with the respective sets being controlled by different CPUs 2a and 2b. In the third embodiment, an incoherent optical image from the CRT 11a is transmitted through the half mirror 30 and projected onto the photocathode 4, whereas the incoherent optical image from the CRT 11b is reflected from the half mirror 30 and projected onto the photocathode 4. This renders it possible for the writing mode to be switched between two units 1a and 1b. It also becomes possible to synthesize two incoherent optical images (i.e. add two binary images) or perform synchronous detection of those images.

While three embodiments of the present invention are described above, it should be noted that these are not the sole embodiments that can be conceived of the invention and that various other modifications can be made. For instance, the CRT used as the optical image display means in the embodiments may be replaced by an image tube, a storage tube, a liquid-crystal display or any other means that are capable of creating an input incoherent optical image in response to an input electric signal.

As described on the foregoing pages, the spatial light modulating device of the present invention has a writing unit that includes a CRT and other components placed in a face-to-face relationship with the photocathode and this enables an input incoherent optical image to be entered in response to an input electric signal. Hence, temporally sequential signals from a CPU can be readily converted into coherent optical information and the device of the present invention can be used extensively in information processing systems of an electric-optical hybrid type as a tool that provides for direct inputting of two-dimensional information obtained by calculations on a computer.

If the CRT is used as a light spot scanner in a film transmission system which usually employs a flying spot tube, pattern matching and other operations on information such as photographic films which are transmitted from a remote place can be readily accomplished. If a CRT of high brightness, high resolution and short persistence of light emission is employed and if the spot diameter on the phosphor screen is controlled to be several tens of microns, the diameter of spot projected onto the photocathode of MSLM can be reduced to a few microns by means of an appropriate lens system, thereby producing an image of high resolution.

What is claimed is:

1. A spatial light modulating device, comprising:

a spatial light modulator having, in a vacuum enclosure, a photoelectric converter and electro-optic means for storing an electron image provided from said photoelectric converter and for creating in itself an optical change;

laser means for launching a laser beam into said electro-optic means to produce a modulated laser beam;

first optical image display means for converting a first input electric signal into a first optical image and displaying said first optical image so as to be incident on a light-receiving surface of said photoelectric converter;

first control means for supplying said first input electric signal to said first optical image display means;

sending means for sending said modulated laser beam; and a half mirror disposed between said first optical image display means and said light-receiving surface of said photoelectric conversion means, for transmitting said first optical image so as to be incident on said light-receiving surface and reflecting said modulated laser beam sent by said sending means so as to be incident on said light-receiving surface.

2. A spatial light modulating device as claimed in claim 1, wherein said sending means comprises a total reflection mirror.

3. A spatial light modulating device, comprising:

a spatial light modulator having, in a vacuum enclosure, a photoelectric converter and electro-optic means for storing an electron image provided from said photoelectric converter and for creating in itself an optical change;

laser means for launching a laser beam into said electro-optic means to produce a modulated laser beam;

first optical image display means for converting a first input electric signal into a first optical image and displaying said first optical image so as to be incident on a light-receiving surface of said photoelectric converter;

first control means for supplying said first input electric signal to said first optical image display means;

second optical image display means for converting a second input electric signal into a second optical image and displaying said second optical image;

second control means for supplying said second input electric signal to said second optical image; and a half mirror for transmitting said first optical image provided from said first display means so as to be incident on said light-receiving surface and for reflecting said second optical image provided from said second display means so as to be incident on said light-receiving surface.

4. A spatial light modulating device as claimed in claim 2, wherein said electro-optic means comprises an electro-optic material whose refractive index distribution is changed in accordance with said electron image.

5. A spatial light modulating device as claimed in claim 4, wherein said spatial light modulator further comprises a microchannel plate for multiplying said electron image.

6. A spatial light modulating device as claimed in claim 3, wherein said electro-optic means comprises an electro-optic material whose refractive index distribution is changed in accordance with said electron image.

7. A spatial light modulating device as claimed in claim 6, wherein said spatial light modulator further comprises a microchannel plate for multiplying said electron image.

* * * * *